3,451,321
PHOTOGRAPHIC APPARATUS
Richard M. Raia, Lexington, and Robert T. Sullivan, Norwood, Mass., assignors to Polaroid Corporation, Cambridge, Mass., a corporation of Delaware
Filed Feb. 24, 1967, Ser. No. 618,407
Int. Cl. G03b 19/02, 27/32
U.S. Cl. 95—11         7 Claims

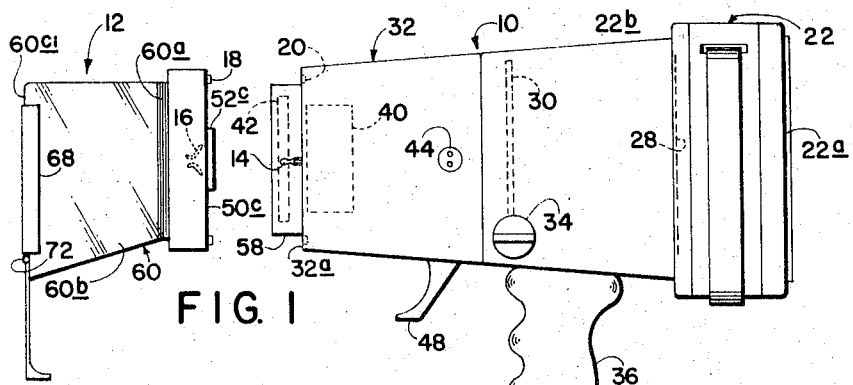

ABSTRACT OF THE DISCLOSURE

A combined magnifying and selectively-variable framing device for attachment to the front of a short-range or "close-up" camera to make photographic prints of a specialized format. The camera includes a compressive processing apparatus for producing finished photographic prints, using a film pack.

---

The device of the present invention, when incorporated with the aforesaid camera, is primarily intended to accomplish the photographing and rapid reproduction, in magnified form, of given printed matter. More particularly, it enables the selective photographing and reproduction of printed text contained in "The National Union Catalog," the standard author-and-title reference book used by libraries, published monthly by the Library of Congress of the United States of America. Substantially all books purchased by libraries throughout at least the United States are checked and rechecked, upon ordering and receipt, against the listings of the "National Union Catalog." An exact reproduction of each listing in this catalog is then utilized by the library in its own reference system on so-called "catalog cards." Catalog cards are an essential "working tool" of every library.

The aforesaid printed textual material, reproduced by the combined camera and device of the invention, is used as a "master" from which a plurality of copies can quickly be made. These copies constitute the finished library catalog cards, ready for use. A considerable number of identical catalog cards is required for each new book procured by the library from the publisher or jobber. Catalog cards for each book need to be "on hand" and available for use before that book can be placed on the library shelf. Thus, until the catalog cards are ready, any book, even though it has been received, cannot be circulated but must temporarily be held "in storage."

Conventional library practice has, in the past, almost invariably involved a great deal of time-consuming handwork with respect to the procurement and disposition of each new book. This has included the hard-copying of listings in the "National Union Catalog," accompanied by the large amount of checking attendant upon any manual operation. It has also necessitated the procurement of the aforesaid requisite catalog cards directly from the Library of Congress. The cards thus obtained are relatively expensive and delays in receiving them of from three weeks to over three months have not been unusual. Meanwhile, as previously intimated, any book relative to which catalog cards had not been received could not be released to the reading public.

The combined camera and device of the present invention eliminate much of the hand-copying and related time-consuming procedures formerly necessary. Production of the essential catalog cards is placed directly within the control of the library itself. The cost of the catalog cards is small and their procurement is substantially immediate. Thus, once any book has been ordered and received by the library, the catalog cards relating thereto may well already have been prepared, or at least they can be prepared without delay. Reliance on a source of supply over which no control of delivery can be exercised is no longer necessary. Accordingly, any new book can, through the instrumentality of the present invention, be made available to the reading public almost immediately upon its receipt.

In accordance with the foregoing considerations, objects of the invention are to provide a camera and a complementary magnifying and framing device for incorporation therewith especially adapted to the photographic reproduction of printed matter; to provide a camera and device of the character described which are particularly adapted, dimensionally and optically, to a magnified selective reproduction of textual matter in the "National Union Catalog" of the Library of Congress; to provide a device of the type stated in the form of an accessory which is releasably attachable to the front of the camera; and to provide a device of the category described which is adapted to combination with a given close-range camera for use by libraries in the photographic reproduction of given textual material to produce, rapidly, in quantity, and at modest expense, so-called library catalog cards.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing wherein:

FIGURE 1 is a diagrammatic side-elevation view of the photographic device and a short-range or close-up camera with which it is adapted to be incorporated;

FIG. 2 is a diagrammatic perspective view of the device, generally from the rear;

FIG. 3 is a diagrammatic perspective view of the combined device and close-up camera, in use; and FIG. 4 is a diagrammatic plan view of a library "catalog card" produced in large part by the combined close-up camera and device of the invention.

Referring now to the drawing, in FIGURE 1 there is shown the combined close-up camera 10 and device 12, the latter being attachable to the front of the camera by the respective pairs of male and female latching means 14 and 16, and correctly aligned by the positioning pins 18 and sockets 20. The camera is of a type known as the "CU-5" camera, sold by Polaroid Corporation, Cambridge, Mass., U.S.A., and described in detail in U.S. Patent 3,295,425.

The camera 10 includes a rear section 22 comprising a chamber portion 22a, in which the film pack and compressive means, for example, a pair of pressure rolls 24 and 26 for processing each photographically exposed film unit, are contained. After passage between the pressure rolls, each film unit is withdrawn through a slot located at an end of the camera at 27. A chamber portion 22b provides an enclosure for transmission of light rays of a photographic exposure to a focal plane at 28. Chamber 22b includes a combined pivotal opaque light-shield or baffle 30 and interlocking latching means, not shown, for releasably-attaching the front camera section 32 thereto. The baffle and latching means are actuatable by a knob 34 in such manner that the camera sections 22 and 32 cannot be separated unless the baffle 30 is positioned across the light aperture of chamber portion 22b, thus protecting a film unit at focal plane 28 from inadvertent exposure. A pistol grip 36 is releasably attachable by threaded coupling means 38 to the chamber portion 22b.

The front camera section 32 includes a lens-shutter-diaphragm assembly, not shown in detail but generally indicated at 40 and comprising, for example, an iris-type diaphragm, a four-element lens, and a between-the-lens shutter. A circular electronic flash lamp 42 substantially surrounds the lens aperture. A socket 44 is adapted to accept a plug 46 having associated lead means connecting the flash lamp to a power supply. Energization of the flash lamp is provided by closing of shutter contacts in a conventional manner at "X" synchronization to provide an exposure flash of given intensity and duration, e.g., one of approximately 1/500 second. The shutter is assumed to be of a self-cocking type and its release is effected by squeezing the trigger 48. The lens component of assembly 40, providing a 1:1 ratio of subject-to-image, may suitably be taken as an f/4.5 to f/45 lens of 75 mm.(3-inch) focal length. Shutter speeds may, appropriately, encompass a range of 1 to 1/125 second and "bulb."

The magnifying and selectively-variable framing accessory 12 comprises a first, rectangular, rear, frame-like section or housing 50 having semi-enclosing side walls 50a and the unitary front wall 50b, preferably composed of a metal such as aluminum. The rearmost edges 50c of the side walls are adapted to be held in firm contact with the front surface 32a of the camera section 32 when the latching plugs 14 and sockets 16 and the positioning pins or studs 18 and sockets 20 are respectively engaged. A lens mount 52 comprising a flat frontal portion 52a is attached to the superimposed front wall 50b of the rear housing by four bolts and nuts 54. The lens mount 52 is preferably composed of an opaque plastic such as that termed "Implex," sold by Rohm and Haas Co., Philadelphia, Pa., U.S.A. A cage-like rearwardly-tapering portion 52b of the lens mount, unitary with the portion 52a and terminating in the circular mounting-ring or bezel 52c, serves to mount a positive lens 56 of 5 diopters. The lens mounting-ring 52c is of a suitable diameter and projects rearwardly by an amount such that, when the device 12 is attached to the camera section 32, the mounting-ring 52c extends within an inner bore of the circular housing portion 58 of the camera section which surrounds the flash lamp 40, the bore, in effect, constituting a forward extension of the camera lens barrel. The lens 56 is thus positioned adjacent to, that is, approximately 27.2 mm. from the first principal point of the four-element camera lens assembly to provide its correct optical position enabling a given 1.6:1 image-to-subject magnifying function in combination with the latter. While the positive lens 56 is of the aforesaid given characteristics to provide a magnification consistent with adequate legibility and a given width of a print., e.g., approximately 3¾", it will be understood that a lens of other magnification characteristics could be employed to satisfy some other requirement of legibility or print size.

Continuing the description of the device 12, a second or frontal spacing and framing section 60, also largely composed of a metal such as aluminum, includes the two short overturned rear portions 60a fastened to the frontal portion 52a of the lens mount by the aforementioned bolts and nuts 54 the two continuous depending side-walls 60b integral with the portions 60a, and the two top and bottom bar-like, transverse front portions 60c, unitary with and extending between the side walls to form, with the edges of the side-walls, a frame providing a rectangular frontal aperture 62 therebetween for fixedly defining the width, and preliminarily defining the depth or height of an area to be photographed. The distance from the front face $60c^1$ of the front portion 60c to the lens 56 is approximately 74 mm.; to the first principal point of the camera lens 101.2 mm.; and to the camera focal plane 254.13 mm. Inasmuch as the front face $60c^1$ is that which is brought into contact with and rests upon the printed text to be photographed, it is to be considered as coplanar with or identical to the latter.

The width of the aperture 62 is fixed at approximately 2⅜", slightly in excess of the width of each printed listing in the "National Union Catalog" of the Library of Congress. The depth of the printed matter to be included in a given photographic print is selectively controlled by the opaque slidable screen element 64. The purpose of the screen is to limit the textual matter to be included in the photographic print to that encompassed by but a single listing, only, of the "catalog," that is to cover any portion of an adjacent listing which might otherwise be visible, and to provide white space in the print for manual insertion of any desired additional data within the blank area provided thereby in the ultimate library catalg card. The screen 64 is preferably composed of a slightly-flexible white or white-coated plastic material, such as nylon, having a matte surface. Slidable movement of the widened screen portions 64a is permitted within the channels 66 formed in the guide elements 68, composed, for example, of the plastic known as "Delrin," sold by E. I. du Pont de Nemours Co., Wilmington, Del. U.S.A. The guides 68 are attached, as by rivets 70 to the inner surfaces of the side-walls 60b. A thickened curved extremity 64b of the screen forms a handle for manually effecting its movement. The extent to which the screen 64 can be withdrawn, to provide a maximum depth of aperture 62, is determined by limit-stop means in the form of the transverse edges 64c of the widened screen portions 64a and the stop pins 72 with which they are brought into contact.

It is to be noted that the upper edges of the side-walls 60b extend parallel to the optical axis of the photographic apparatus comprised by the combined camera 10 and device 12 and that the lower edges of the side-walls extend downwardly at an acute angle. This flared construction provides both a relatively wide base for firmly supporting the assembly of camera 10 and device 12, as shown in FIG. 3, and a length of the channels 66 accommodating to functioning of the limit stop means 64c and 72, thereby permitting a maximum withdrawal of the trailing edge of the screen 64 to the very edge of the photographically recordable area, where the text is of an extreme depth.

A completed library catalog card 74 of conventional size and shape and having a perforation 76 for insertion of a file rod is illustrated in FIG. 4. The lines under the name are intended to represent printed matter such as that of listings in the above-mentioned "National Union Catalog." All of the printed matter under bracket 78 has been photographically recorded on a "master" print, produced as above described by the combined camera 10 and device 12 of the invention, and transferred therefrom to the card 74, as by a xerographic or other suitable process. The printed matter under bracket 80 represents reference matter which has been added manually.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A magnifying and selectively-variable framing device for use with a short-range or close-up type of camera incorporating a lens of given characteristics and electronic flash means generally surrounding its lens aperture, said device being capable of photographically recording in conjunction with said camera lens, a magnified version of certain printed material of given width and a variety of depths while blocking out unwanted adjacent printed material and comprising a rear rectangular frame-like section including four joined semi-enclosing side-walls and and integral partial front wall, latching and positioning means adapted to releasably engage complementary latching and positioning means located at the front of said camera, lens-mounting means fastened to and extending rearwardly from said front-wall centrally of said side-walls and terminating in a circular lens-mounting bezel adapted to be inserted within a forward extension of the lens barrel of said camera in engaging relation therewith, a positive lens mounted in said bezel adapted in conjunction with said camera lens to produce a magnified image of said printed material, a spacing and framing frontal section including a pair of side members attached at over-turned rear extremities thereof to said rear section and extending forwardly from the latter, a pair of transverse bar members interconnecting said side members at their forward upper and lower extremities to provide a rectangular framing aperture of given width and depth therebetween, a pair of guide elements fastened to frontal portions of said side members and including a channel formed lengthwise of each, an opaque manually-actuatable screen mounted for slidable movement in the channels for varying the depth of said framing aperture, and limit-stop means for determining the extent of said movement of said screen.

2. A magnifying and selectively-variable framing device, as defined in claim 1, wherein said circular lens-mounting bezel extends rearwardly beyond the rear limits of said side-walls.

3. A magnifying and selectively-variable framing device, as defined in claim 1, wherein said screen is white, has a matte surface, and includes handle means at one end for manually effecting its slidable movement.

4. A magnifying and selectively-variable framing device, as defined in claim 1, wherein one edge of each said side member of said frontal section is disposed parallel to an optical axis of said camera and combined device, and said other edge of each said side member is disposed at an acute angle away from said optical axis.

5. A magnifying and selectively-variable framing device, as defined in claim 1, wherein said latching means of said device is composed of a pair of horizontally-spaced sockets and said positioning means thereof is in the form of four, spaced, rearwardly-extending stud components.

6. In combination with a short-range fixed-focus camera having a multi-element lens normally providing a 1:1 image-to-subject ratio and including a flash lamp generally surrounding its lens aperture and compressive processing means adjacent to its film-holding compartment for producing finished photographic prints from compressible film units embodying a processing liquid, a magnifying and selectively-variable framing device for releasable attachment to the front of said camera for photographically recording in conjunction with said camera lens a magnified version of certain printed catalog material to enable the rapid production of library catalog cards, said device comprising, in order of arrangement, a rear rectangular frame-like section including four joined semi-enclosing side-walls and an integral partial front-wall, latching and positioning means adapted to releasably engage complementary latching and positioning means located at the front of said camera, lens mounting means fastened to and extending rearwardly from said front-wall centrally of said side-walls and terminating in a circular lens-mounting bezel adapted to be inserted within a forward extension of the barrel of said camera in engaging relation therewith, a positive lens mounted in said bezel adapted in conjunction with said camera lens to produce a magnified image of said printed material, a spacing and framing frontal section including a pair of side members attached at over-turned rear extremities thereof to said rear section and extending forwardly from the latter, a pair of transverse bar members interconnecting said side members at their forward top and bottom extremities to provide a rectangular framing aperture of given width and depth therebetween, a pair of guide elements fastened to frontal portions of said side members and including a channel formed lengthwise of each, an opaque manually-actuatable screen mounted for slidable movement in the channels for varying the depth of said framing aperture, and limit-stop means for determining the extent of said movement of said screen.

7. A magnifying and selectively-variable framing device, as defined in claim 6, wherein said camera lens is an f/4.5 to f/45 four-element lens of 75 mm. (3-inch) focal length and wherein said lens of said device mounted in said bezel is a positive lens of 5 diopters.

References Cited

UNITED STATES PATENTS

| | | | |
|---|---|---|---|
| 3,385,188 | 5/1968 | Ellman | 95—11 |
| 3,386,359 | 6/1968 | Gentile | 95—11 |

NORTON ANSHER, *Primary Examiner.*

CHARLES E. SMITH, *Assistant Examiner.*

U.S. Cl. X.R.

95—44